United States Patent
Kothuvatiparambil et al.

(10) Patent No.: US 11,966,697 B2
(45) Date of Patent: Apr. 23, 2024

(54) SYSTEMS AND METHODS FOR AUTOMATED DEGRADATION-RESISTANT TUNING OF MACHINE-LEARNING LANGUAGE PROCESSING MODELS

(71) Applicant: Bank of America Corporation, Charlotte, NC (US)

(72) Inventors: Viju Kothuvatiparambil, Plano, TX (US); Donatus Asumu, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 1089 days.

(21) Appl. No.: 16/437,183

(22) Filed: Jun. 11, 2019

(65) Prior Publication Data
US 2020/0394469 A1 Dec. 17, 2020

(51) Int. Cl.
*G06F 40/279* (2020.01)
*G06F 18/21* (2023.01)
*G06F 18/214* (2023.01)
*G06F 40/20* (2020.01)
*G06N 20/00* (2019.01)

(52) U.S. Cl.
CPC .......... *G06F 40/279* (2020.01); *G06F 18/214* (2023.01); *G06F 18/2185* (2023.01); *G06F 40/20* (2020.01); *G06N 20/00* (2019.01)

(58) Field of Classification Search
CPC ..... G06F 40/20; G06F 40/279; G06K 9/6256; G06K 9/6262; G06K 9/6264; G06N 20/00
USPC .......................................................... 706/25
See application file for complete search history.

(56) References Cited

U.S. PATENT DOCUMENTS

| | | | |
|---|---|---|---|
| 7,606,714 B2 | 10/2009 | Williams et al. | |
| 8,543,401 B2 | 9/2013 | Suendermann et al. | |
| 8,606,575 B1 | 12/2013 | Witt-ehsani | |
| 9,047,271 B1* | 6/2015 | Mengibar | G10L 15/197 |
| 10,388,274 B1* | 8/2019 | Hoffmeister | G06N 3/044 |
| 10,510,336 B2* | 12/2019 | Amid | G06F 16/35 |
| 10,824,962 B2* | 11/2020 | Singaraju | G06F 40/35 |
| 2012/0284212 A1* | 11/2012 | Lin | G06N 20/00 |
| | | | 706/12 |
| 2015/0310862 A1* | 10/2015 | Dauphin | G06F 40/30 |
| | | | 704/257 |
| 2019/0102078 A1* | 4/2019 | Bhatt | G06F 3/0481 |
| 2019/0103092 A1* | 4/2019 | Rusak | G06F 40/35 |
| 2019/0166069 A1* | 5/2019 | Yao | G06N 20/00 |
| 2019/0303796 A1* | 10/2019 | Balasubramanian | G06N 7/005 |

(Continued)

*Primary Examiner* — Stephen S Hong
*Assistant Examiner* — Nicholas Hasty
(74) *Attorney, Agent, or Firm* — Weiss & Arons LLP

(57) ABSTRACT

Systems and methods for automated, degradation-resistant, tuning of machine-learning ("ML") models are provided. The systems and methods may identify an inoperative input utterance, retrieve a feature set associated with the inoperative input utterance, and generate an updated utterance-feature-intent ("UFI") mapping based on the retrieved feature set. The systems and methods may retrain the ML model using the updated UFI mapping, and compare the accuracy of the system after the retraining and before the retraining. In a scenario where the accuracy of the system does not improve, the systems and methods may amplify the updated UFI mapping. In a scenario where the accuracy of the system does improve, the systems and methods may deploy the updated UFI mapping.

10 Claims, 3 Drawing Sheets

(56) References Cited

U.S. PATENT DOCUMENTS

2020/0193353 A1* 6/2020 Weisman ......... G06Q 10/06393
2020/0327197 A1* 10/2020 Bhowal ................. G06N 5/041

* cited by examiner

SYSTEMS AND METHODS FOR AUTOMATED DEGRADATION-RESISTANT TUNING OF MACHINE-LEARNING LANGUAGE PROCESSING MODELS

FIELD OF TECHNOLOGY

Aspects of the disclosure relate to artificial intelligence ("AI") computer systems. Specifically, aspects of the disclosure relate to machine-learning ("ML") platforms associated with language processing.

BACKGROUND OF THE DISCLOSURE

Computerized systems with artificial intelligence ("AI") may execute every-day tasks with great effectiveness. An example of an AI system may be an intelligent conversational assistant that is able to derive the intent of an utterance spoken, or otherwise conveyed, by a person.

The conversational assistant may be employed by an entity in a customer-facing role. The role may substitute for a customer-service representative. The conversational assistant may be tasked with comprehending (i.e., deriving the intent of), addressing, and/or responding to a customer query.

The success, or failure, of the interaction with the conversational assistant may impact customer satisfaction. The success of the interaction may be directly linked to the accuracy of the AI system. The accuracy, in turn, may depend, in large part, on a robust machine-learning ("ML") model supporting the AI system.

An ML model may include a learning algorithm that "learns" from training data. Modifying, or tuning, the training data may affect—negatively or positively—the accuracy of the ML model. It would be desirable, therefore, to provide automated systems and methods for tuning the data to improve the ML model.

A particular challenge faced when tuning ML models is maintaining accuracy across the system as a whole. For example, an update to the system may improve accuracy for some utterances, while degrading the accuracy of other utterances. Therefore, it is an object of the embodiments to provide an automated ML tuning system that improves accuracy while resisting degradation elsewhere in the system.

SUMMARY OF THE DISCLOSURE

Aspects of the disclosure relate to a machine-learning ("ML")-based system with automated tuning. The system may include an ML model that is configured to derive a comprehension of an input utterance. The ML model may be trained using a training set. The training set may be stored in a database, and may include a plurality of utterances mapped to a plurality of intents. Each of the plurality of utterances may be assigned a set of features.

The system may include a tuning module. The tuning module may improve the comprehension of the ML model while resisting degradation in the comprehension. The tuning module may be configured to flag an inoperative input utterance. For the purposes of this application, the term "inoperative utterance" should be understood to refer to an utterance for which the system fails to accurately derive an intent.

The tuning module may also be configured to retrieve a feature set associated with the inoperative input utterance. The tuning module may also be configured to generate, based on the feature set, an utterance-feature-intent ("UFI") mapping between the inoperative input utterance, the feature set, and an intent.

The tuning module may be configured to update the ML model with the mapping. The tuning module may also be configured to compare a performance of the ML model before and after the update. When the performance vis-à-vis the inoperative input utterance improves, and the performance vis-à-vis other input utterances is maintained or improves, the tuning module may be configured to deploy the update.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
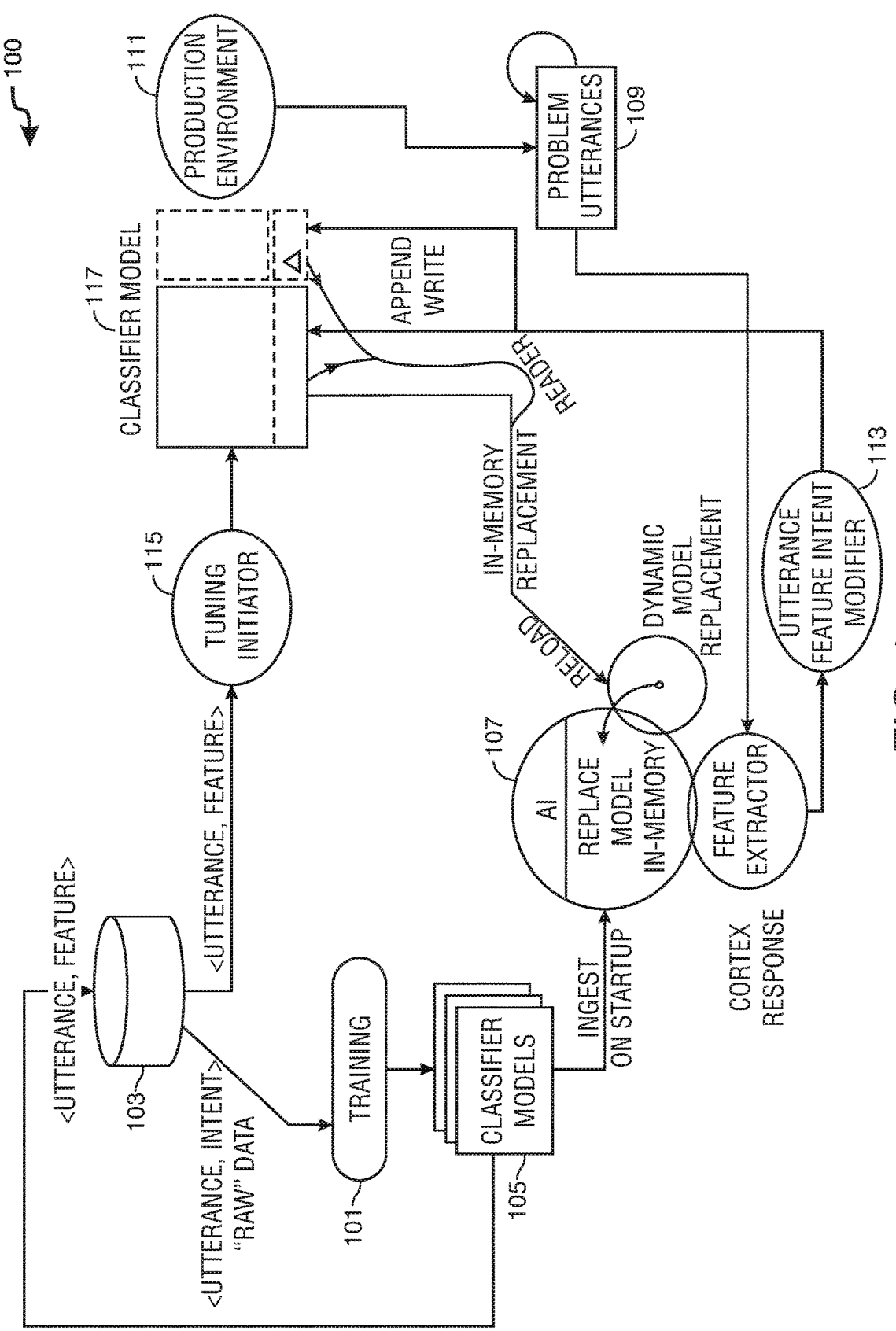
FIG. 1 shows an illustrative schematic in accordance with principles of the disclosure.

Systems and methods disclosed herein may relate to an artificial intelligence ("AI") system such as an intelligent conversational assistant. An intelligent conversational assistant may be designed to compute, among other things, the intent of an utterance, even if the system has not yet encountered that precise utterance. An utterance may be a word or combination of words. The utterance may be spoken, typed, written, gestured, or otherwise conveyed. The intent of an utterance may be the intended meaning underlying the utterance.

The intelligence of the AI system may rely on one or more machine-learning ("ML") models. An ML model may use hardware and/or software to "learn" from training data stored in a database, and, when encountering a new utterance, compute the appropriate intent.

An ML model may be trained. The training may include initializing the training data. The training may include updating the training data. Updating the training data may involve addition, modification and/or removal of exemplary utterances and semantic relationships.

A method for training an ML-based language-processing system with automated tuning is provided. The method may include compiling a training set. The training set may be stored in a database. The training set may include a plurality of utterances mapped to a plurality of intents. The method may include assigning a set of features to each of the plurality of utterances. A feature may be an attribute assigned to a token (a word or set of words) of the utterance.

The method may include training an ML model, at least in part using the training set, to derive a comprehension (i.e., the intent) of an input utterance. The trained ML model may enable the AI system to extract the intent (what a user wants to do), as well as one or more entities (data that supports the intent), from an input utterance.

For example, given the utterance: "Provide me the monthly statements for 2010 for account **6789," the system may derive an intent of: GET_STATEMENTS, with entities: [DateRange: 2010-01-01, 2010-12-31] and [AccountNumber: **6789].

In another example, given the utterance: "Could you please provide the **0200, 1366, 7880 and 3897 total debits balance for Aug. 5 2015," the system may derive an intent of: GET_BALANCE, with entities: [Date: 2015-08-05] and [AccountNumbers: 0200, 1366, 7880 and **3897].

The basis of intent identification and entity extraction may be, at least in part, the computational use of the attributes of the utterance. These attributes (alternatively referred to herein as features) describe (or map) the utterance into multi-dimensional space. Each dimension is represented using a single feature. Each feature may be assigned to a token of the utterance. The tokens may be the individual words of the utterance. Tokens may also be groups of words of the utterance (e.g., bigrams, trigrams, n-grams). Features may represent the set of attributes that ascribe meaning to these tokens. For the above two exemplary utterances, two exemplary categories of attributes may be used, BOW and CONCEPT. BOW, or Bag Of Words, may be a general way that a single word or token is described. CONCEPT may be used to describe a word that has a specific meaning in a particular field. The particular field may be banking domain, so an exemplary CONCEPT attribute may include an account balance, or similar. The particular attributes for each category may be selected from a predetermined list of attributes. Other suitable features and feature categories may be used as well.

To illustrate using the two exemplary utterances above:

For the utterance "Provide me the monthly statements for 2010 for account **6789," the tokens may include: [Provide, me, the, monthly, statements, for, 2010, account, **6789]. The features may include: [CONCEPT=Account, CONCEPT=BankStatement, CONCEPT=Monthly, CONCEPT=View, CONCEPT=Recurring, BOW=for].

For the utterance "Could you please provide the **0200, 1366, 7880 and 3897 total debits balance for Aug. 5 2015," the tokens may include: [Could, you, please, provide, the, 0200, 1366, 7880 and **3897, total, debits, balance, for, Aug. 5 2015]. The features may include: [BOW=aug, BOW=and, CONCEPT=RequestFromAssistant, BOW=for, CONCEPT=Offer, CONCEPT=Balance, BOW=debits, BOW=debit, BOW=total].

The method may include identifying a set of inoperative input utterances and a set of operative input utterances. Inoperative input utterances (alternatively referred to herein as failed utterances or problem utterances) may include utterances for which the system fails to accurately (i.e., correctly) derive an intent. Operative input utterances may be utterances for which the system succeeds in accurately deriving an intent. Identifying a success or failure may, in some embodiments, include user feedback. For example, a customer using a conversational assistant, or a system administrator, may provide feedback that the system succeeded or failed to correctly derive the intent of an utterance.

Identifying an utterance as operative or inoperative may, in certain embodiments, be based at least in part on a threshold score. The score may be a ratio of successes vs. failures. The score may be a percentage of successes, or a percentage of failures. The score may be a raw number of successes or a raw number of failures.

The method may include deriving a first accuracy score for the set of inoperative input utterances and a first accuracy score for the set of operative input utterances.

The method may include tuning the ML model. The tuning may include retrieving a set of features associated with each inoperative input utterance from the set of inoperative input utterances.

For example, the utterance "Tell me today's balance on accounts **80200 and **13640" may be identified as an inoperative utterance that is being misclassified by the AI system (e.g., because a valid intent was not identified, no intent (NULL intent) was returned, or other suitable determination for an inoperative utterance). The system may determine that the intent GET_BALANCE should be the suitable intent for this utterance. The determination may be the result of an algorithm. The algorithm may include iterating through a list of intent results for the utterance by score—i.e., if the highest scoring intent for an utterance is flagged as inaccurate, the system may attempt the second highest scoring intent, etc. The algorithm may be a brute force algorithm. The determination may also include input from a human, e.g., the person who flagged the utterance as inaccurate or an ML expert.

Using the new mapping of: "Tell me today's balance on accounts **80200 and **13640"|GET_BALANCE as a guideline, the ML model may generate the following feature set based on the current model: [CONCEPT=Account, CONCEPT=View, BOW=on, BOW=and, CONCEPT=Soon, CONCEPT=Balance].

The tuning may include generating, based on the retrieved feature set, an updated utterance-feature-intent ("UFI") mapping. For example, given the following portion of an illustrative original utterance-feature-intent ("UFI") mapping:

#######Original Model Mapping##############

"Show me the account balance"|CONCEPT=Account, CONCEPT=View, CONCEPT=Balance|GET_BALANCE "Show the balance"|CONCEPT=View, CONCEPT=Balance|GET_BALANCE "Show me the opening available balances from last month"|CONCEPT=View, CONCEPT=Available, BOW=from, CONCEPT=Balance, BOW=opening|GET_BALANCE "Kindly show F F & R Inc decision maker list"|CONCEPT=View, BOW=f, CONCEPT=RequestFromAssistant, BOW=r, CONCEPT=ExternalContact, BOW=inc|BB_GET_CONTACT "Can you please show me the **0200, 3640, 6790, 5678 & **07631 balance for 5 Jul. 2027"|CONCEPT=View, CONCEPT=RequestFromAssistant, BOW=for, CONCEPT=Balance|GET_BALANCE The system may update the mapping:

##############Updated Mapping##############

"Tell me today's balance on accounts **80200 and 13640" |CONCEPT=Account, CONCEPT=View, BOW=on, BOW=and, CONCEPT=Soon, CONCEPT=Balance|GET_BALANCE "Show me the account balance"|CONCEPT=Account, CONCEPT=View, CONCEPT=Balance|GET_BALANCE "Show the balance"|CONCEPT=View, CONCEPT=Balance|GET_BALANCE "Show me the opening available balances from last month"|CONCEPT=View, CONCEPT=Available, BOW=from, CONCEPT=Balance, BOW=opening|GET_BALANCE "Kindly show F F & R Inc decision maker list"|CONCEPT=View, BOW=f, CONCEPT=RequestFromAssistant, BOW=r, CONCEPT=ExternalContact, BOW=inc|BB_GET_CONTACT "Can you please show me the 0200, 3640, 6790, 5678 & **07631 balance for 5 Jul. 2027"|CONCEPT=View, CONCEPT=RequestFromAssistant, BOW=for, CONCEPT=Balance|GET_BALANCE The tuning may include retraining the ML model, in a controlled environment, using the updated UFI mapping. The controlled environment may be a testing environment. The controlled environment may include a working memory (RAM). The controlled environment may be an environment apart from a production environment. The retraining may include using the updated mappings to re-generate a new training model, which may be dynamically reloaded into the system.

The tuning may also include generating an updated accuracy score (e.g., via a tuning analyzer or regression accuracy tester) for the set of inoperative input utterances and for the set of operative input utterances. The updated accuracy score may be based on the retrained ML model.

In a scenario where the updated accuracy score for the set of inoperative input utterances is greater than the first accuracy score for the set of inoperative input utterances, and the updated accuracy score for the set of operative input utterances is greater than or equal to the first accuracy score for the set of operative input utterances, the tuning may include deploying the updated UFI mapping. Deploying the updated UFI mapping may include incorporating the updated UFI mapping into the training set for use in a production environment.

In a scenario where the updated accuracy score for the set of inoperative input utterances is less than or equal to the first accuracy score for the set of inoperative input utterances, and the updated accuracy score for the set of operative input utterances is greater than or equal to the first accuracy score for the set of operative input utterances, the tuning may include amplifying the impact of the updated UFI mapping by retraining the ML model with a plurality of instances of the updated UFI mapping.

In some embodiments of the method, generating the updated UFI mapping may be executed as a function of an output, from the ML model, of at least one of the inoperative input utterances. The output may include a feature set associated with the inoperative input utterance.

In certain embodiments, the tuning may be executed separately for each inoperative input utterance. The tuning process executed separately for each inoperative input utterance may include: retrieving the feature set, generating the updated UFI mapping, retraining the ML model, generating an updated accuracy score, and/or determining a relationship between the updated accuracy scores and the original accuracy scores.

In some embodiments of the method, the amplifying the impact of the updated UFI mapping may be executed incrementally. The incremental execution may include retraining the ML model with a first instance of the updated UFI mapping, generating a new updated accuracy score for the set of inoperative input utterances and for the set of operative input utterances. When the new updated accuracy score for the set of inoperative input utterances is still less than or equal to the first accuracy score for the set of inoperative input utterances, and the new updated accuracy score for the set of operative input utterances is still greater than or equal to the first accuracy score for the set of operative input utterances, the incremental execution may include retraining the ML model with another instance of the updated UFI mapping. In some embodiments, each successive incremental instance of the updated mapping may be modified, sequentially or otherwise, over the previous instance.

The incremental execution may be a loop that is executed numerous times. It may be executed a predetermined maximum number of times. In some embodiments, the ML model may be retrained with a maximum of three instances of the updated UFI mapping. Other embodiments may define another maximum number, e.g., 2, 4, 5, 6, 10 or any other suitable number.

In certain embodiments, amplifying the impact of the updated UFI mapping may be executed exclusively for short utterances. A short utterance may, in certain embodiments, be defined as an utterance with a maximum of three tokens. Other embodiments may define another maximum number for short utterances, e.g., 2, 4, 5, 6, 10 or any other suitable number.

A machine-learning ("ML")-based system with automated tuning is provided. The system may include an ML model that is configured to derive a comprehension of an input utterance. The ML model may be trained using a training set. The training set may be stored in a database, and may include a plurality of utterances mapped to a plurality of intents. Each of the plurality of utterances may be assigned a set of features.

The system may include a tuning module. The tuning module may improve the comprehension of the ML model while resisting degradation (i.e., a reduction in accuracy) in the comprehension. The tuning module may be configured to flag an inoperative input utterance. The tuning module may also be configured to retrieve a feature set associated with the inoperative input utterance. The tuning module may further be configured to generate, based on the feature set, an utterance-feature-intent ("UFI") mapping between the inoperative input utterance, the feature set, and an intent.

The tuning module may be configured to update the ML model with the mapping. The update may, in certain embodiments, be implemented in a testing environment. The tuning module may also be configured to compare a performance of the ML model before and after the update. When the performance vis-à-vis the inoperative input utterance improves, and the performance vis-à-vis other input utterances is maintained or improves, the tuning module may be configured to deploy the update.

In some embodiments of the system, when the performance vis-à-vis the inoperative input utterance is maintained or degrades, and the performance vis-à-vis other input utterances is maintained or improves, the tuning module may further be configured to incrementally apply a plurality of instances of the UFI mapping to the ML model.

In certain embodiments of the system, the tuning module may be configured to incrementally apply the plurality of instances of the UFI mapping to the ML model only for short utterances. A short utterance may be defined as an utterance with a maximum of three tokens.

In some embodiments, the tuning module may be configured to incrementally apply a maximum of three instances of the UFI mapping to the ML model.

The inoperative input utterance may, in some embodiments, be one of a set of inoperative input utterances. The tuning module may be further configured to generate the UFI mapping, and perform other tuning features, for each inoperative input utterance separately.

In some embodiments, the performance of the ML model may be measured via a testing module that is configured to determine an accuracy of the ML model. The testing module may be alternatively referred to herein as a tuning analyzer.

A machine-learning ("ML")-based language-processing system with automated tuning is provided. The system may include an ML model that is configured to derive a comprehension of an input utterance. The ML model may be trained using a training set. The training set may be stored in a database. The database may, in certain embodiments, be cloud-based. The training set may include a plurality of utterances mapped to a plurality of intents. Each of the plurality of utterances may be assigned a set of features.

The system may include a tuning module. The tuning module may improve the comprehension of the ML model while resisting degradation in the comprehension. The tuning module may be configured to identify a set of inoperative input utterances and a set of operative input utterances. The tuning module may also be configured to derive a first accuracy score for the set of inoperative input utterances and for the set of operative input utterances. The tuning module may further be configured to retrieve a feature set associated with each the inoperative input utterance from the set of inoperative input utterances.

The tuning module may be configured to generate, based on the feature set, an updated utterance-feature-intent ("UFI") mapping. The tuning module may also be configured to retrain the ML model, in a controlled environment, using the updated UFI mapping. The tuning module may further be configured to generate an updated accuracy score for the set of inoperative input utterances and for the set of operative input utterances. The updated accuracy score may be based on the retrained ML model.

In a scenario where the updated accuracy score for the set of inoperative input utterances is less than or equal to the first accuracy score for the set of inoperative input utterances, and the updated accuracy score for the set of operative input utterances is greater than or equal to the first accuracy score for the set of operative input utterances, the tuning module may be configured to amplify the impact of the updated UFI mapping. Amplifying the impact may include retraining the ML model with a plurality of instances of the updated UFI mapping.

In a scenario where the updated accuracy score for the set of inoperative input utterances is greater than the first accuracy score for the set of inoperative input utterances, and the updated accuracy score for the set of operative input utterances is greater than or equal to the first accuracy score for the set of operative input utterances, the tuning module may be configured to deploy the updated UFI mapping.

In certain embodiments of the system, the tuning module may be configured to generate the updated UFI mapping as a function of an output from the ML model. The output may be associated with an input to the ML model. The input may include at least one of the inoperative input utterances.

In some embodiments, the tuning module may be further configured to generate an updated UFI mapping separately for each inoperative input utterance from the set of inoperative utterances.

In certain embodiments of the system, the tuning module may be further configured to amplify the impact of the updated UFI mapping incrementally. When amplifying incrementally, the tuning module may be configured to retrain the ML model with a first instance of the updated UFI mapping and generate a new updated accuracy score for the set of inoperative input utterances and for the set of operative input utterances. When the new updated accuracy score for the set of inoperative input utterances is still less than or equal to the first accuracy score for the set of inoperative input utterances, and the updated accuracy score for the set of operative input utterances is still greater than or equal to the first accuracy score for the set of operative input utterances, the tuning module may be configured to retrain the ML model with another instance of the updated UFI mapping.

In some embodiments, amplifying the impact of the updated UFI mapping may be limited. The limitation may be such that the ML model is retrained with a maximum of three instances of the updated UFI mapping.

In some embodiments of the system, the tuning module may be configured to amplify the impact of the updated UFI mapping only for short utterances. A short utterance may, in certain preferred embodiments, be defined as an utterance with a maximum of three tokens.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows illustrative schematic 100 in accordance with aspects of the disclosure. Schematic 100 shows a training process (101) that may be triggered to, inter alia, assign a set of features to a set of training utterances. Features may be distinctive attributes assigned to the tokens of each training utterance. Training process (101) shows one embodiment of system elements and method steps for degradation-resistant tuning of an ML model. Other embodiments may include different elements and/or steps.

The training utterances may be stored in a repository (103). The training utterances may be transformed by the training process into a set of classifier models (105). The set of classifier models (105) may be fed to an AI process (107) that may be used for comprehension of utterances at runtime.

Over time, there may be failures in comprehension. A set of utterances (109) that may have failed in the production environment (111), may be flagged for analysis and tuning. These utterances may represent statements (speech, text or gestures) that are not being correctly identified and acted upon by the AI process. A process of failed utterance analysis (113, 115) may be used to update the classifier model (117) in order to improve comprehension. The process may include adding and/or modifying training utterances in order to ensure that problem utterances are introduced into the classifier model in such a way that the problem (inability to correctly identify an intent) is resolved without causing a loss of overall accuracy of the system. The process may include running a regression test (in the ML sense, regression can mean modelling a target value based on independent predictors, e.g., for forecasting) to compare the accuracy of the system before and after tuning changes have been made.

Figure 2:
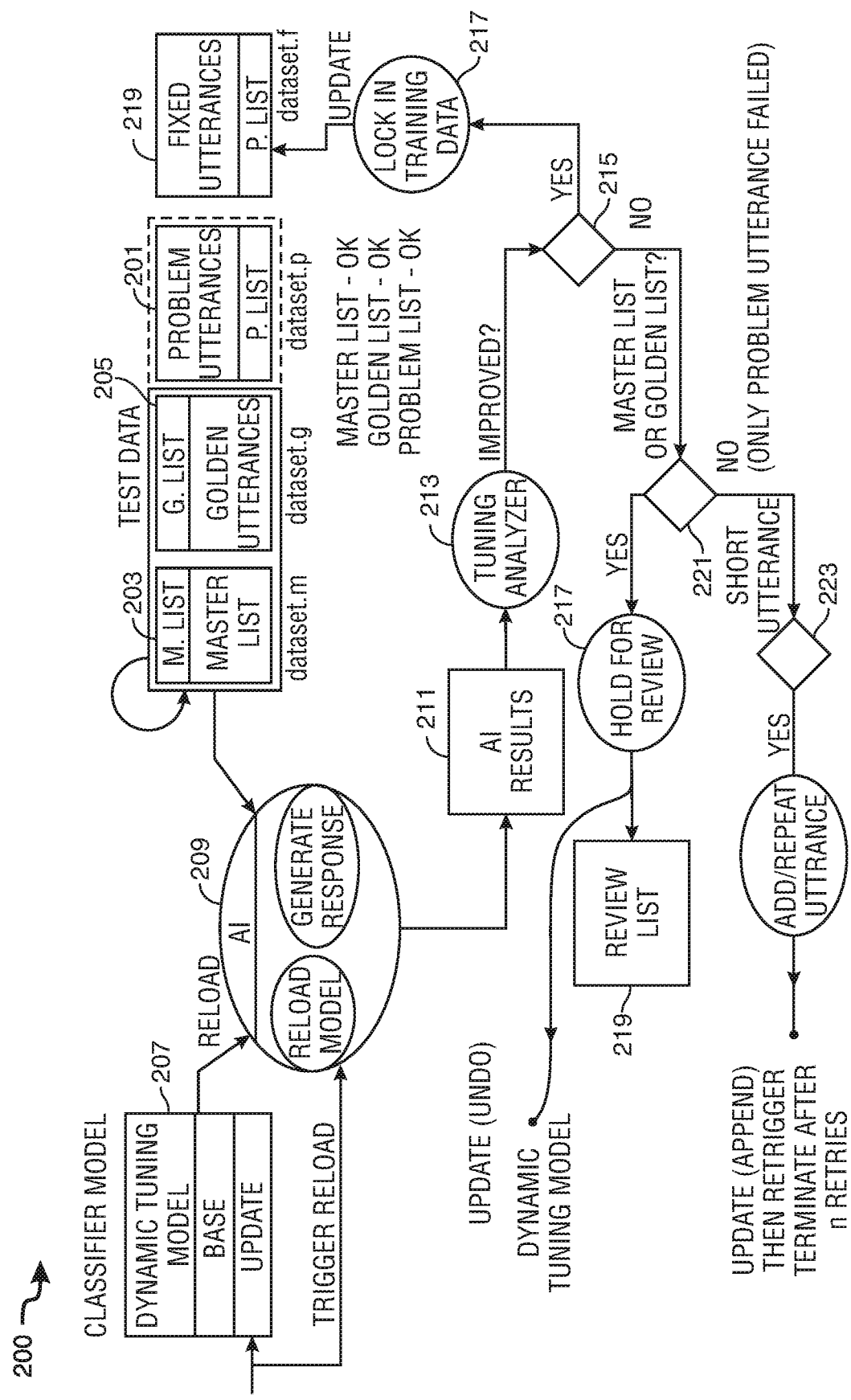
FIG. 2 shows another illustrative schematic in accordance with principles of the disclosure.

FIG. 2 shows illustrative schematic 200 of an automated tuning process in accordance with aspects of the disclosure. The automated tuning process shown in schematic 200 shows one embodiment of system elements and method steps for use in degradation-resistant tuning of an ML model. Other embodiments may include different elements and/or steps.

The system may identify a set of problem utterances (201) for which an AI system is misclassifying (unable to correctly detect the intent), and another set of utterances that represent those for which the intent is correctly identified (this may include a master.dataset (203) and a golden.dataset (205)—where a "golden" dataset may refer to data that is accepted to have a high level of accuracy. The golden dataset may also be associated with reduced tolerance for accuracy degradation). The automated tuning process shown in schematic 200 may show how each element in the problem utterances can be automatically tuned.

The process may include loading the current state of the classifier model (207) into the AI processor (209). Each problem utterance in turn may be submitted as input to AI processor (209). The response (211) from AI processor (209) may contain the feature set that corresponds to the utterance. This feature set can then be used to rewrite the utterance-feature-intent ("UFI") mapping as a new additional input to the dynamic training model (207). This updated model may then be reloaded into AI processor (209).

A tuning analyzer (213) may then be used to measure the improvement in the outcomes of (a) master.dataset (203), (b) golden.dataset (205) and (c) problem.dataset (201). If the outcomes of (a) and (b) are either unchanged or they improve and the outcome of (c) is also improved, i.e., decision step (215) is YES, then the automated setting of the correct intent to the problem utterance is considered successful. This new association may be locked-in (alternatively referred to herein as "deployed") (217) by entering the updated training data for the utterance into a dataset (219) that may ultimately be added without further intervention into the next version of the training dataset (207).

If the decision at (215) is NO, and the master.dataset and golden.dataset degrade (i.e., are associated with reduced accuracy), then the problem statement may be held for further review (217) e.g., in a review list (219).

If the decision at (221) is NO—i.e., only the problem utterance failed but the master.dataset and golden.dataset are still accurate, then a check for shortness of the utterance may be made (223). A short utterance may be a phrase which includes one, two, or three tokens. Such utterances may be addressed by adding up to three instances of the modified utterance into the training data. For each addition of an instance of the modified utterance, the tuning analyzer (213) may be used to check the regression accuracy of the change. Should the automated attempt to tune the short utterance fail, then the problem utterance may be held for review (217).

Figure 3:
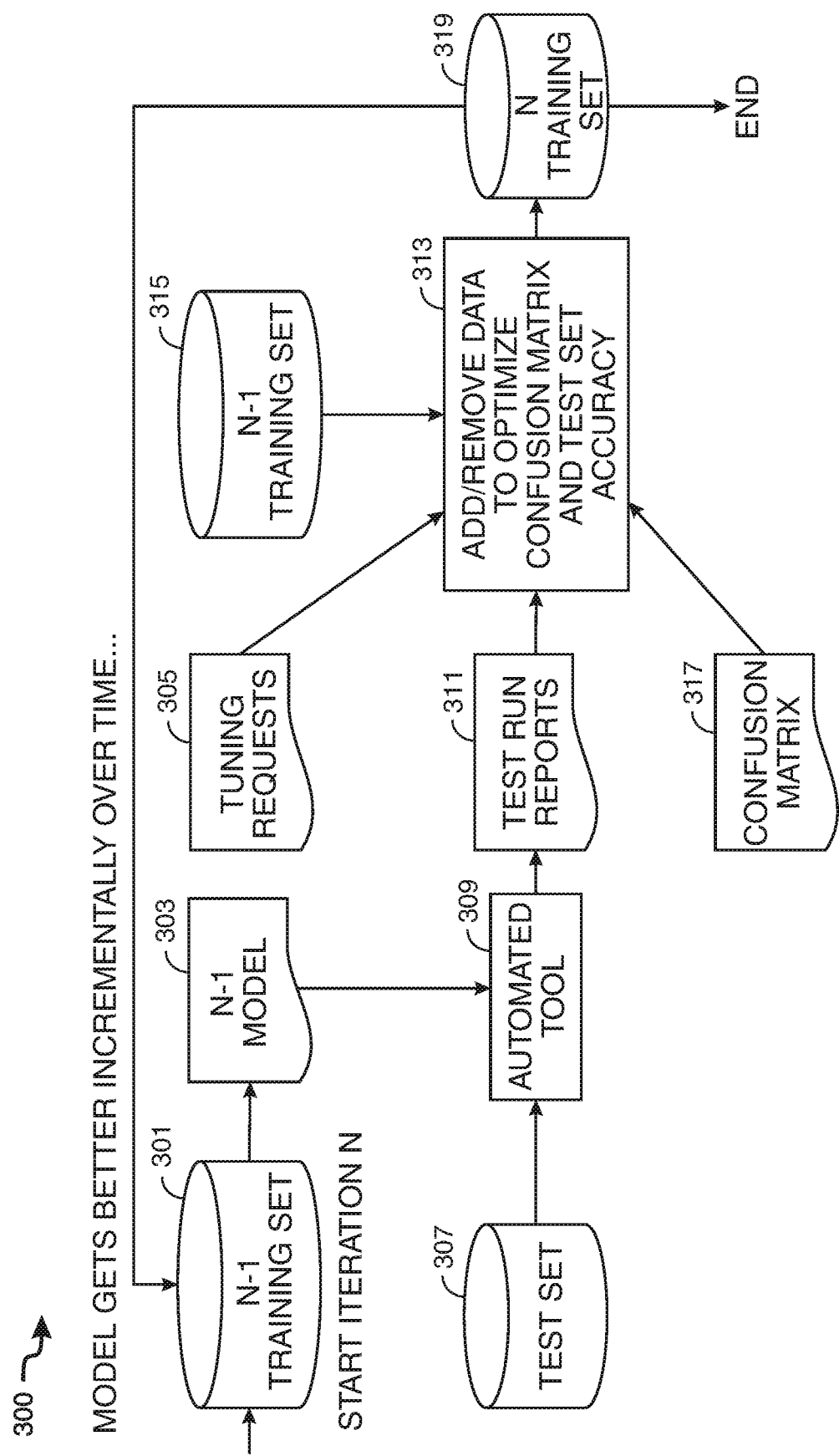
FIG. 3 shows yet another illustrative schematic in accordance with principles of the disclosure.

FIG. 3 shows illustrative schematic 300 in accordance with aspects of the disclosure. Schematic 300 shows a high-level overview of the systems and methods for degradation-resistant tuning of an ML model. The tuning process shown in schematic 300 may include other elements and/or steps not shown in the schematic. The tuning process shown in schematic 300 shows one embodiment. Other embodiments may include different elements and/or steps.

The tuning process shown in schematic 300 may be an iterative process. Schematic 300 may show one iteration, beginning with the current (N−1) Training set 301. Current Training set 301 may be used to train the current (N−1) ML model 303. A set of inoperative utterances may be determined via a received tuning request 305, or any other suitable determination. A test set 307 of utterances may be tested via an automated regression tool 309. Test run reports 311 may indicate the overall accuracy of the system. At step 313, the current training set 315 may be modified and tested along with confusion matrix 317. If the test results show improved accuracy across the system, the modifications may be deployed into the next iteration of the training set, N (319).

Thus, aspects of the disclosure provide systems and methods for automated, degradation-resistant, tuning of ML models. Such automation may enable "hands-free" correction of a class of problem utterances while maintaining regression accuracy.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for automated degradation-resistant tuning of machine-learning language processing models are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for training a machine-learning ("ML")-based language-processing system with automated tuning, the method comprising:
   compiling a training set, said training set that is stored in a database and comprises a plurality of utterances mapped to a plurality of intents;
   assigning a set of features to each of the plurality of utterances;
   training an ML model, using the training set, to derive a comprehension of an input utterance;
   identifying a set of inoperative input utterances and a set of operative input utterances, wherein an inoperative utterance is an utterance that returns a null intent response;

deriving a first accuracy score for the set of inoperative input utterances and for the set of operative input utterances;

iterating through the set of inoperative input utterances and the set of operative input utterances based on the derived accuracy score, such that when a highest scoring intent for an utterance is flagged as inaccurate, the method further comprises attempting to determine whether the second highest scoring intent is inaccurate; and tuning the ML model, said tuning comprising:
retrieving a set of features associated with each inoperative input utterance from the set of inoperative input utterances;
generating an updated utterance-feature-intent ("UFI") mapping;
retraining the ML model, in a controlled environment, using the updated UFI mapping;
generating an updated accuracy score for the set of inoperative input utterances and for the set of operative input utterances, said updated accuracy score based on the retrained ML model;
when the updated accuracy score for the set of inoperative input utterances is less than or equal to the first accuracy score for the set of inoperative input utterances, and the updated accuracy score for the set of operative input utterances is greater than or equal to the first accuracy score for the set of operative input utterances, amplifying the impact of the updated UFI mapping by retraining the ML model with a plurality of instances of the updated UFI mapping; and
when the updated accuracy score for the set of inoperative input utterances is greater than the first accuracy score for the set of inoperative input utterances, and the updated accuracy score for the set of operative input utterances is greater than or equal to the first accuracy score for the set of operative input utterances, deploying the updated UFI mapping wherein the amplifying the impact of the updated UFI mapping is executed incrementally, said incremental execution comprising:
retraining the ML model with a first instance of the updated UFI mapping;
generating a new updated accuracy score for the set of inoperative input utterances and for the set of operative input utterances;
when the new updated accuracy score for the set of inoperative input utterances is still less than or equal to the first accuracy score for the set of inoperative input utterances, and the new updated accuracy score for the set of operative input utterances is still greater than or equal to the first accuracy score for the set of operative input utterances, retraining the ML model with another instance of the updated UFI mapping; and
wherein the ML model is retrained with a maximum of three instances of the updated UFI mapping.

2. The method of claim 1, wherein the generating the updated UFI mapping is executed as a function of an output, from the ML model, of at least one of the inoperative input utterances.

3. The method of claim 1, wherein the tuning is executed separately for each inoperative input utterance from the set of inoperative input utterances.

4. The method of claim 1, wherein the amplifying the impact of the updated UFI mapping is only executed for short utterances.

5. The method of claim 4, wherein the short utterance comprises a maximum of three tokens.

6. A machine-learning ("ML")-based language-processing system with automated tuning, said system comprising:
an ML model that is configured to derive a comprehension of an input utterance, wherein:
said ML model is trained using a training set;
the training set is stored in a database and comprises a plurality of utterances mapped to a plurality of intents; and
each of the plurality of utterances is assigned a set of features; and
a tuning module, said tuning module for improving the comprehension of the ML model while resisting degradation in the comprehension, said tuning module configured to:
identify a set of inoperative input utterances and a set of operative input utterances, wherein an inoperative utterance is an utterance that returns a null intent response;
iterate through the set of inoperative input utterances and the set of operative input utterances based on the derived accuracy score, such that when the highest scoring intent for an utterance is flagged as inaccurate, the tuning module is further configured to attempt to determine whether the second highest scoring intent is inaccurate;
derive a first accuracy score for the set of inoperative input utterances and for the set of operative input utterances;
retrieve a feature set associated with each inoperative input utterance from the set of inoperative input utterances;
generate, based on the feature set, an updated utterance-feature-intent ("UFI") mapping;
retrain the ML model, in a controlled environment, using the updated UFI mapping;
generate an updated accuracy score for the set of inoperative input utterances and for the set of operative input utterances, said updated accuracy score based on the retrained ML model;
when the updated accuracy score for the set of inoperative input utterances is less than or equal to the first accuracy score for the set of inoperative input utterances, and the updated accuracy score for the set of operative input utterances is greater than or equal to the first accuracy score for the set of operative input utterances, amplify the impact of the updated UFI mapping by retraining the ML model with a plurality of instances of the updated UFI mapping; and
when the updated accuracy score for the set of inoperative input utterances is greater than the first accuracy score for the set of inoperative input utterances, and the updated accuracy score for the set of operative input utterances is greater than or equal to the first accuracy score for the set of operative input utterances, deploy the updated UFI mapping;
wherein the tuning module is further configured to amplify the impact of the updated UFI mapping incrementally, wherein the tuning module is configured to:
retrain the ML model with a first instance of the updated UFI mapping;

generate a new updated accuracy score for the set of inoperative input utterances and for the set of operative input utterances;

when the new updated accuracy score for the set of inoperative input utterances is still less than or equal to the first accuracy score for the set of inoperative input utterances, and the updated accuracy score for the set of operative input utterances is still greater than or equal to the first accuracy score for the set of operative input utterances, retrain the ML model with another instance of the updated UFI mapping; and wherein the ML model is retrained with a maximum of three instances of the updated UFI mapping.

7. The system of claim 6, wherein the tuning module is configured to generate the updated UFI mapping as a function of an output, from the ML model, of at least one of the inoperative input utterances.

8. The system of claim 6, wherein the tuning module is further configured to generate an updated UFI mapping separately for each inoperative input utterance from the set of inoperative utterances.

9. The system of claim 6, wherein the tuning module is configured to amplify the impact of the updated UFI mapping only for short utterances.

10. The system of claim 9, wherein the short utterance comprises a maximum of three tokens.

\* \* \* \* \*